March 4, 1958 S. DUINKER 2,825,891
MAGNETIC MEMORY DEVICE
Filed Aug. 24, 1954 2 Sheets-Sheet 1

INVENTOR
SIMON DUINKER
BY Fred M. Vogel
AGENT

INVENTOR
SIMON DUINKER
BY Fred M. Vogel
AGENT

United States Patent Office 2,825,891

Patented Mar. 4, 1958

2,825,891

MAGNETIC MEMORY DEVICE

Simon Duinker, Eindhoven, Netherlands, assignor, by mesne assignments, to North American Philips Company, Inc., New York, N. Y., a corporation of Delaware Application August 24, 1954, Serial No. 451,929

Claims priority, application Netherlands September 9, 1953

9 Claims. (Cl. 340—174)

This invention relates to static magnetic triggers arranged in a two-dimensional pattern, a so-called memory matrix in which the static magnetic triggers are arranged in rows and columns to form an array.

In known constructions, the static magnetic triggers comprise an annular core made from a material having a substantially rectangular polarisation or hysteresis curve and a high remanence containing the required read-in and read-out windings. The polarisation condition of the remanent flux determines the information supplied to the trigger arrangement. This information is supplied in the form of electric pulses to the magnetic circuit through one or more electric conductors which are connected to the circuit, and may either be windings or single wires.

Such annular cores suffer from the disadvantages that the pulses supplied to the conductors connected to the core require comparatively large powers, and the maximal recurrence frequency of these pulses is limited.

The chief object of the present invention is to provide a construction for a ferromagnetic core of such a device in which these disadvantages are obviated and which yields additional advantages which will be described hereinafter.

In accordance with the invention, the ferromagnetic core comprises a plate constituted of a material of low reluctance and provided with a plurality of recesses arrayed in a two-dimensional pattern. The recesses are birdged by a member of a material having a substantially rectangular polarisation curve and a high remanence, thus forming a two-dimensional pattern of magnetic circuits for static magnetic triggers.

The invention will now be described with reference to the accompanying drawings, in which.

Figure 1:
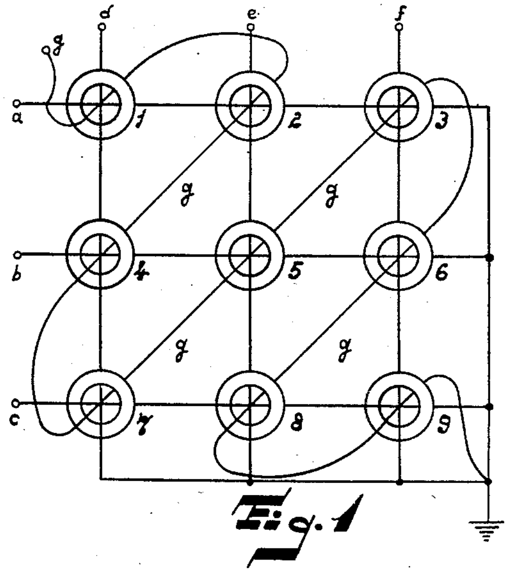
Fig. 1 shows a conventional memory matrix consisting of a two-dimensional pattern of annular cores.

In the memory matrix shown in Fig. 1, the magnetic circuits are constituted in a known manner of a set of annular cores each made from a material having a substantially rectangular polarisation curve and a high remanence, the cores being arranged in a two dimensional pattern and each core along with the associated electric conductors constituting a static magnetic trigger.

Figure 2:
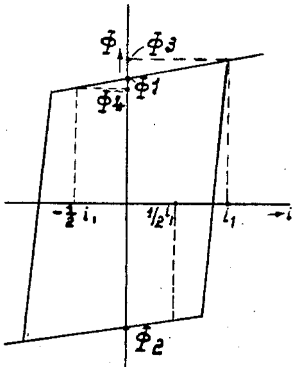
Fig. 2 shows a hysteresis loop suitable for the core of a matrix.

Fig. 2 depicts the hysteresis loop of such a core, where the flux $\Phi$ is plotted as a function of the current $i$ passed through a conductor connected to the core. The term "substantially rectangular polarisation curve" is to be understood to mean that the ratio between the flux $\Phi_4$, which occurs if $i=-\frac{1}{2}i_1$ (Fig. 2), and the remanent flux $\Phi_1$ is substantially unity. In practice, the ratio is generally between about 0.7 and 1. With such a core, if $i=0$, there are two remanence conditions, that is to say, the polarisation condition $\Phi_1$ and the polarisation condition $\Phi_2$. The condition $\Phi_1$ corresponds, for example, to a "0" of the coded information, and $\Phi_2$ to a "1." Let the circuit be in the condition $\Phi_1$, then a positive pulse having a value $i_1$ supplied to a conductor connected to the core will produce flux variations $\Phi_3-\Phi_1$ and $\Phi_1-\Phi_3$ in the core, which flux variations will induce voltages in a second conductor connected to the core. If the circuit is in the condition $\Phi_2$, a positive pulse supplied to the first-mentioned conductor will produce a flux variation $\Phi_3-\Phi_2$ at the leading edge of said pulse, and a flux variation $\Phi_1-\Phi_3$ at the trailing edge, which variations will also induce voltages across the second conductor, of which voltages the first peak occurring with the leading edge of the pulse materially exceeds the first voltage peak which occurs if the circuit is in the condition $\Phi_1$. It is to be noted that with such a pulse value, that is to say $i_1$, the circuit, after supplying a pulse to the first-mentioned conductor, invariably assumes the condition $\Phi_1$, which corresponds to a "0" of the coded information. The fixation of a memory element "1," which means that the circuit is caused to assume a condition $\Phi_2$, is effected by supplying to the first mentioned conductor a negative pulse whose absolute value is at least equal to $i_1$.

The difference between a "0" and a "1" in reading-out the information is consequently based on the difference between the voltage peaks over the second winding, which difference is due to the difference in flux variations $\Phi_3-\Phi_1$ and $\Phi_3-\Phi_2$.

The cores 1 to 9 (Fig. 1) are interconnected through input windings *a* to *f* and an output winding *g*, which windings are single conductors.

If all the cores 1 to 9 are in the condition $\Phi_1$, the reading-in of a "1," characterized by the condition $\Phi_2$, in a given core is effected by supplying to each conductor associated with said core a pulse having a value $\frac{1}{2}i_1$ (Fig. 2). In the core 8, for example, a "1" is read-in by supplying a pulse of such magnitude through each of the conductors *e* and *c*, the cores 2, 5, 7 and 9 then being energised by one pulse $\frac{1}{2}i_1$. This pulse, however, is too small (with a suitable choice of the hysteresis loop) to effect a transition from $\Phi_1$ to $\Phi_2$ of these cores. The reading-out is effected similarly as described with reference to Fig. 2, except that the reading-out pulse $i$, now consists of two pulses having a value $\frac{1}{2}i_1$ simultaneously appearing in two conductors.

The construction shown in Fig. 1 suffers from the limitations described previously, namely, that the pulses supplied to the conductors connected to the cores require fairly high powers and that the maximum recurrence frequency of the pulses is limited. Moreover, the construction shown in Fig. 1 has a further limitation that its manufacture from its component parts to the finished product requires considerable time and great care. The annular cores have to be threaded together one by one to form the pattern depicted. Fracture of one of the cores, either during manufacture or in the finished product, unavoidably necessitates at least partial dismounting of the pattern and renewed threading of the cores.

Figures 3, 4:
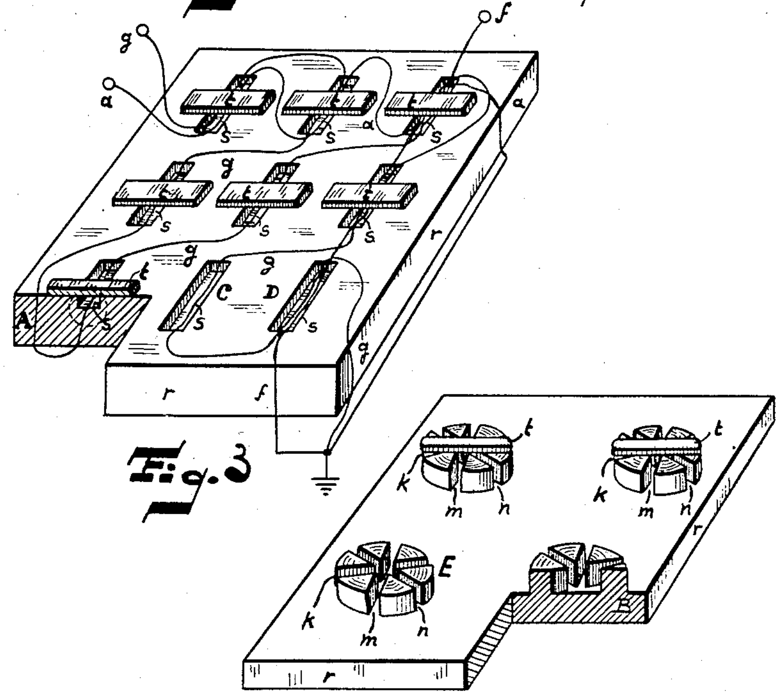
Figs. 3, 4, 5, 6, 7 and 8 show various embodiments of ferromagnetic cores in accordance with the invention.

Fig. 3 shows a ferromagnetic core of a device according to the invention, in which all of these drawbacks are obviated. In Fig. 3, a plate *r*, made from a magnetic material of low reluctance, is provided with a plurality of holes in the form of recesses *s*. A thin strip *t* made from a material exhibiting a substantially rectangular polarisation curve and high remanence bridges each of the recesses *s*. Conductors, for example, *a*, *b*, *c* and so on, as shown in Fig. 1, are laid in the grooves or recesses *s*. For example, the core shown in Fig. 3 comprises conductors *a*, *f* and *g* which are connected to the magnetic circuits of the core in the same sense and manner as the corresponding conductors of the construction shown in Fig. 1 are connected to the corresponding magnetic circuits of the cores 1 to 9. The strip or member *t* with the adjacent material of the plate *r* constitutes a magnetic circuit for a static magnetic trigger. Such a circuit is shown in a sectional view at A, the strips *t* being omitted at C and D. The hatched circle at A shows diagrammatically the magnetic circuit of the trigger. The active part of this circuit substantially consists of the magnetic portion extending in the strip *t*. By thus materially reducing the active length of the portion of the circuit exhibiting the substantially rectangular polarisation curve and high remanence relative to that of an annular core, which must invariably enable providing the required conductors through the ring, the losses in this portion are much smaller than in the case of the annular core. The losses in the other portion of the magnetic circuit are negligibly small as the result of the low reluctance material. Since the contact surfaces between the strip *t* and the plate *r* are comparatively large, the reluctance of the air-gaps is likewise negligibly low relative to the reluctance of the strip *t*. These losses are even further reduced if both the strip *t* and the plate *r* are constituted of substantially electrically non-conductive material. Inasmuch as the losses in a circuit as shown in Fig. 3 are much lowe rthan that of the circuit shown in Fig. 1, and to a greater degree if the strip *t* is thinner, the required power of the pulses supplied to the conductors are likewise much lower, and, moreover, the maximum recurrence frequency of the pulses may be chosen higher.

It will be appreciated that the manufacture of the total structure from the parts shown, that is to say, the plate *r* with recesses *s*, the conductors *a, b, c* and so on, and the strips *t*, is simple and requires little time. After providing the required conductors in the recesses, the strips *t* need only be secured over said recesses to the plate *r*. In the case of fracture of one of said strips, it is only necessary to replace the part in question by another part without removing any of the other strips *t* or the conductors, as would be required in the construction shown in Fig. 1.

Fig. 4 shows a further embodiment of the invention, in which the recesses or holes consist of three intersecting slots *k, m* and *n* accommodating, for example, three conductors *a, d* and *g* (Fig. 1), and at whose intersection the member *t* of a material having a substantially rectangular polarisation curve and a high remanence is provided. In the construction shown in this figure, the material of the plate *r*, which does not include the recesses *s*, is broken away for the greater part. The plates *t* are omitted at B and E, and the surrounding area of the slots is shown in a sectional view at B.

Figure 5:
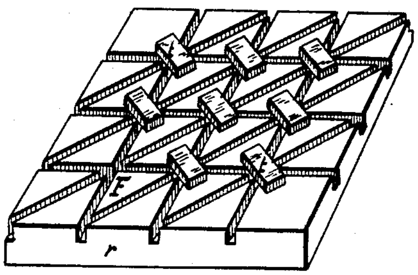
Figure 6:
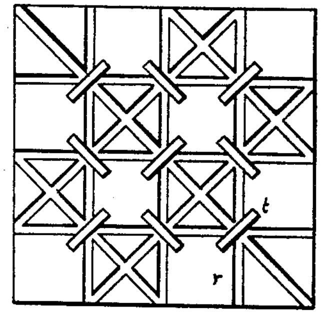
Figure 9:
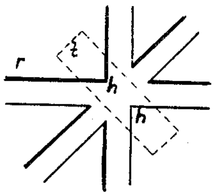
Figs. 9 and 10 are detail views of a construction in accordance with the invention.
Figure 10:
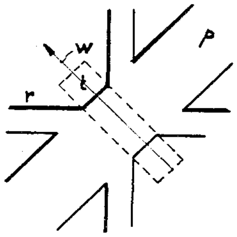

The conductors may be provided in a much simpler manner if the slots *k, m* and *n* of the magnetic circuits extend in line with one another. Fig. 5 shows an extremely robust construction of such an embodiment. In this example, the slots accommodating the conductors, moreover, extend throughout the material of the plate *r* and merge into one another. The strip *t* is not shown at F. Such an intersection of slots is separately shown in Fig. 9, where the strip *t* is indicated in dotted lines. Assuming the strips *t* to be perfectly equal, both in regard to size and properties, it may still be possible that the magnetic circuits are not equivalent, because either of the two corners *h* may have crumbled off or been unevenly ground in forming the slots, and to slightly different degrees at the intersections, so that the various active lengths of the strip *t* are unequal. Therefore, it is preferred to remove the corners *h* in making the plate *r*, at least in the immediate proximity of the location where *r* and *t* engage each other. This may be automatically obtained, for example, by providing a slot *p* that is made wider than the two other slots (Fig. 10), or by removing the material of the corners *h* by drilling a hole at the center of the intersection. The boundaries of *r* and *t*, in the last-mentioned case, approximately, are then two straight lines both extending substantially at right angles to the direction of the active length *w* of *t*. With the flats thus obtained, these disadvantages are greatly reduced. In the construction shown in Fig. 5, the members *t* made from material of substantially rectangular polarisation curves and a high remanence likewise extend in line with one another. Otherwise, this need not always be the case, for example, as illustrated in the construction shown in Fig. 6, which may be used for a memory matrix with a selection system slightly different from that shown in Figs. 1 and 3.

Figure 7:
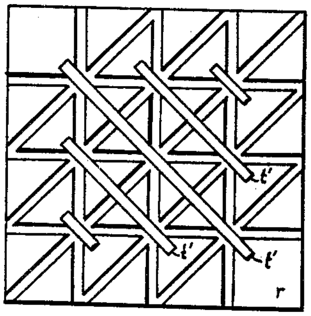
Figure 8:
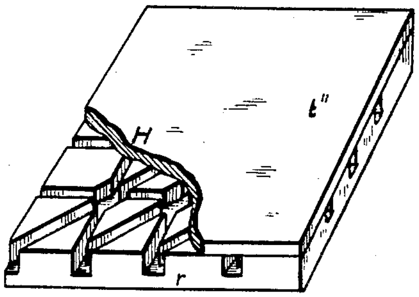

If a plurality of parts *t* extend in line with one another, they may be replaced by a common strip of a material having a substantially rectangular polarisation curve and a high remanence, which adds to the strength of the construction. Fig. 7 shows a construction of this type, where *t'* represents the common strips. In such a case, it is even possible to replace the strips *t'* by a plate *t''* covering the whole plate *r* and made of a material having a substantially rectangular polarisation curve and a high remanence, provided that the plate *t''* has a preferential direction in the direction of the initial strips *t'* with respect to said properties. Fig 8 shows a construction of this type, a part of the plate *t''* being broken away at H. More particularly, single crystals endowed with said preferential properties and, more especially, ferritic single crystals are eminently suitable for such a plate *t''*.

The core construction in accordance with the invention has been described for use in a memory matrix. Of course, however, such a construction may be used whenever two-dimensional patterns of static magnetic triggers are employed.

The most fragile parts of the construction in accordance with the invention are the strips *t*, the strips *t'* or the plate *t''*, since these elements should be as thin as possible. In order to strengthen these parts, they may at one side be secured to arbitrarily thick non-ferromagnetic material, the strips *t*, the strips *t'* or the plate *t''* then being secured, of course, to the plate *r* at the other side.

In order to make the whole construction sturdier, it may be embedded in protecting material such as, for example, glass or synthetic resin.

Suitable low reluctance materials for the plate *r* are, for example, any one of many well-known soft ferromagnetic materials, such as soft iron and several ferrites. The ferrite materials are electrically non-conductive. (See Teletech 11, 5, May 1952, page 50.)

Electrically non-conductive materials are preferred.

Suitable materials exhibiting the high remanence and the rectangular polarisation curve are also well-known, such as materials obtained by producing in a magnetic material, such as nickel iron or a ferrite material, by means of mechanical and thermal operations, such as rolling, pressing and annealing, a determined grain structure with the result that an anisotropic material is obtained which for a definite magnetisation direction exhibits a rectangular polarisation characteristic. (See: Teletech 11, 5, May 1952, page 50; P. I. R. E., April 1952, page 475; Electronics, April 1953, page 146.)

The electrically non-conductive material is likewise preferred.

An example of a ferritic single crystal plate exhibiting preferential directions of magnetization, i. e., anisotropic materials, for the construction illustrated in Fig. 8 is e. g. the same ferrite material as noted above but not polycrystalline.

While I have described my invention in connection with specific embodiments and applications, other modifications thereof will be readily apparent to those skilled in this art without departing from the spirit and scope of the invention as defined in the appended claims.

What is claimed is:

1. A magnetic device comprising a ferromagnetic core for static magnetic trigger circuits arranged in a two-dimensional pattern, said core comprising a body constituted of a material exhibiting low reluctance, said body having a plurality of recesses therein arranged in a two-dimensional pattern, a member in engagement with said body and bridging at least one of said recesses, said member being constituted of a material exhibiting a substantially rectangular hysteresis curve and a high remanence, and conductors within the recesses and underneath the member.

2. A device as claimed in claim 1 in which each recess consists of at least two intersecting slots, the intersection of the slots being bridged by said member.

3. A device as claimed in claim 2 in which the boundaries of the walls of the slots at the intersection are approximately straight lines both extending substantially at right angles to the direction of length of said member.

4. A device as claimed in claim 2 in which some of the slots forming the recesses extend in line with one another, the member being strip-like in form.

5. A magnetic device comprising a ferromagnetic core for static magnetic trigger circuits arranged in a two-dimensional pattern, said core comprising a plate constituted of a material exhibiting low reluctance, said plate having a plurality of recesses therein arrayed in a two-dimensional pattern, some of said recesses being arrayed in a straight line, a single strip-like member in engagement with said plate and overlying all of the recesses arrayed in a straight line, said member being constituted of a material exhibiting a substantially rectangular hysteresis curve and a high remanence, and a conductor within each of said recesses and underneath said member.

6. A magnetic device comprising a ferromagnetic core for static magnetic trigger circuits arranged in a two-dimensional pattern, said core comprising a plate constituted of a material exhibiting low reluctance, said plate having a plurality of recesses therein uniformly oriented and arrayed in a two-dimensional pattern, a single member in engagement with said plate and overlying all of said recesses, said member being constituted of a material exhibiting a substantially rectangular hysteresis curve and a high remanence, said member being anisotropic, and a conductor within each of said recesses and underneath said member.

7. A device as claimed in claim 6 in which the member consists of a single ferritic crystal.

8. A static magnetic trigger circuit comprising a plurality of triggers arrayed in a two-dimensional pattern, said circuit comprising a plate constituted of a material exhibiting low reluctance, said plate having a plurality of slots therein arrayed in a two-dimensional pattern, a plurality of strip-like members in engagement with said plate and overlying said slots, said members each being constituted of a material exhibiting a substantially rectangular hysteresis curve and a high remanence, and a plurality of conductors disposed in said slots between said plate and said members.

9. A magnetic memory device comprising a first substantially planar ferromagnetic core member constituted of low reluctance material and possessing an array of holes extending in two dimensions, magnetic portions possessing a substantially rectangular hysteresis curve associated with said holes and forming with the adjacent core portions of the first core member a plurality of magnetic circuits and including at least one second member mounted on said first core member and overlying at least one of said holes, and a conductor traversing said hole and coupled to the associated magnetic circuit.

References Cited in the file of this patent

UNITED STATES PATENTS

| | | |
|---|---|---|
| 2,430,457 | Dimond | Nov. 11, 1947 |
| 2,700,150 | Wales | Jan. 18, 1955 |
| 2,781,503 | Saunders | Feb. 12, 1957 |